(12) United States Patent
Chambers (10) Patent No.: US 7,013,355 B2
(45) Date of Patent: Mar. 14, 2006

(54) DEVICE AND METHOD FOR IMPROVED SERIAL BUS TRANSACTION USING INCREMENTAL ADDRESS DECODE

(75) Inventor: Peter Chambers, Phoenix, AZ (US)

(73) Assignee: Micrel, Incorporated, San Jose, CA (US)

( * ) Notice: Subject to any disclaimer, the term of this patent is extended or adjusted under 35 U.S.C. 154(b) by 464 days.

(21) Appl. No.: 10/340,443

(22) Filed: Jan. 9, 2003

(65) Prior Publication Data

US 2004/0139258 A1 Jul. 15, 2004

(51) Int. Cl.
*G06F 13/00* (2006.01)

(52) U.S. Cl. ............... 710/110; 710/313; 710/316; 710/2; 710/38

(58) Field of Classification Search .......... 710/313, 710/316, 38
See application file for complete search history.

(56) References Cited

U.S. PATENT DOCUMENTS

| 3,693,161 | A | * | 9/1972 | Price et al. ............... 710/38 |
| 3,725,874 | A | * | 4/1973 | Van Heel ............... 711/220 |
| 3,938,100 | A | * | 2/1976 | Steiner .................. 711/206 |
| 4,170,039 | A | * | 10/1979 | Beacom et al. ........... 711/207 |
| 4,205,373 | A | * | 5/1980 | Shah et al. .............. 710/306 |
| 5,530,895 | A | * | 6/1996 | Enstrom ................. 710/9 |
| 6,134,619 | A | * | 10/2000 | Futral et al. ............ 710/112 |
| 6,339,806 | B1 | * | 1/2002 | Foster et al. ........... 710/313 |
| 6,816,939 | B1 | * | 11/2004 | Bandholz et al. ........ 710/305 |
| 6,826,621 | B1 | * | 11/2004 | Kephart et al. .......... 709/238 |
| 2003/0156477 | A1 | * | 8/2003 | Morgan et al. ........... 365/200 |
| 2004/0168012 | A1 | * | 8/2004 | Tsai ..................... 711/5 |
| 2004/0268138 | A1 | * | 12/2004 | Larson et al. ........... 713/200 |
| 2005/0002384 | A1 | * | 1/2005 | Larson et al. ........... 370/360 |
| 2005/0165989 | A1 | * | 7/2005 | Kim .................... 710/260 |

OTHER PUBLICATIONS

Philips Semiconductors, "The 12C Specification", 2000, Philips Semiconductors, Ver. 2.1.*

* cited by examiner

*Primary Examiner*—Rehana Perveen
*Assistant Examiner*—Justin King
(74) *Attorney, Agent, or Firm*—Bever, Hoffman & Harms, LLP; Patrick T. Bever (57) ABSTRACT

An incremental or bit by bit address decode scheme allows each device on a serial bus to determine as soon as possible if it is the device being addressed by a master device. As each address bit is received serially into a device, it is immediately compared with a corresponding bit of the device's address. As soon as there is a bit not matching, the device in question is determined to not be the one addressed by the master device. It can then be disengaged from the communication process and free up as soon as possible its internal resource initially reserved for possible access by the master device.

12 Claims, 5 Drawing Sheets

| Bus Trans. | Master | Slave (being read) |
|---|---|---|
| 1 | START \| SLAVE ADDRESS \| R/W | Requests control of Internal Bus; Matches address |
| 2 | | ACK    If address matches |
| 3 | CLK \| ACK \| CLK --- | DATA    DATA ----- |
| 4 | STOP | |

DEVICE AND METHOD FOR IMPROVED SERIAL BUS TRANSACTION USING INCREMENTAL ADDRESS DECODE

FIELD OF THE INVENTION

This invention relates generally to a device and method for improved serial bus transactions, and more particularly to one in which devices not addressed on a serial bus are identified and disengaged quickly through an incremental or bit by bit address decode scheme.

BACKGROUND OF THE INVENTION

A digital system, such as an embedded system, typically contains multiple integrated circuit ("IC") devices. A number of standard interfaces have been established for the various IC devices to communicate with each other or with outside devices. Typically, control, diagnostic and power management information as well as data are exchanged via an interconnecting serial bus according to specified protocols and electrical signals.

For example, one industry standard serial bus is the I²C-bus defined by Phillips Semiconductors, Eindhoven, The Netherlands (www.semiconductors.philips.com/buses/i2c/.) Another standard serial bus interface compatible with the I²C bus is the System Management ("SM") bus defined by Intel® Corporation, California, U.S.A (www.smbus.org.) These and other serial bus interfaces allow IC devices to exchange control signals, addresses and data serially among themselves or with the outside world with a minimum of wires.

Figure 1A:
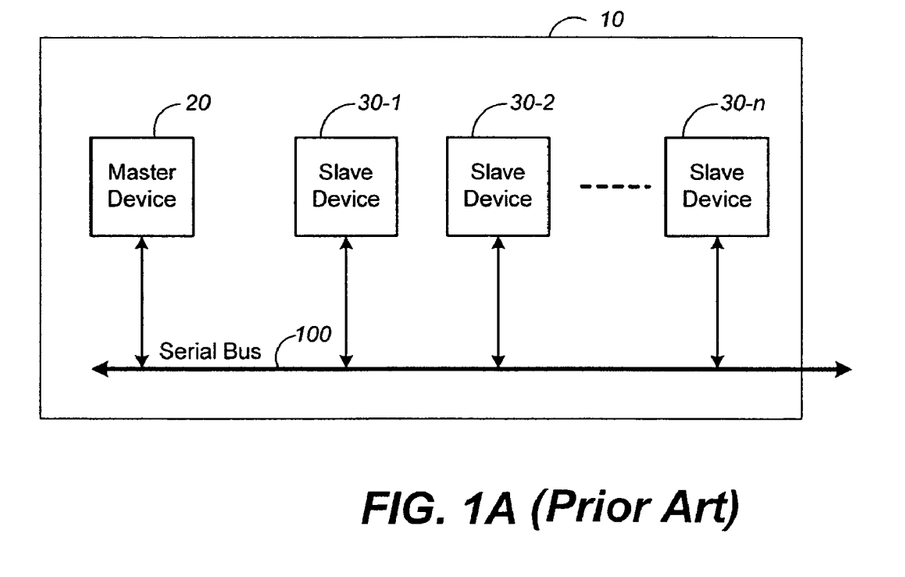
FIG. 1A illustrates a typical communication system in which various IC devices are interconnected by a serial bus.

FIG. 1A illustrates a typical communication system in which various IC devices are interconnected by a serial bus. The system 10 contains a number of devices such as devices 20, 30-1, 30-2, ..., 30-n. Typically one of the devices in the system initiates a communication link with another device on the bus 100. The initiating device assumes the role of a master device, such as device 20, and the device being called on assumes the role of a slave device, such as device 30-1.

Figure 1B:
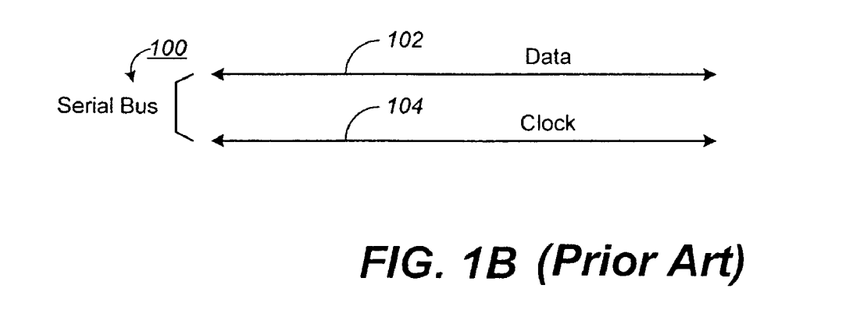
FIG. 1B illustrates a specific example of a serial bus shown in FIG. 1A as being a bi-directional, 2-wire bus.

FIG. 1B illustrates a specific example of a serial bus shown in FIG. 1A as being a bi-directional, 2-wire bus. The 2-wire serial bus 100 is constituted with a data wire 102 for carrying data and a clock wire 104 for carrying clock signals.

Figure 2:
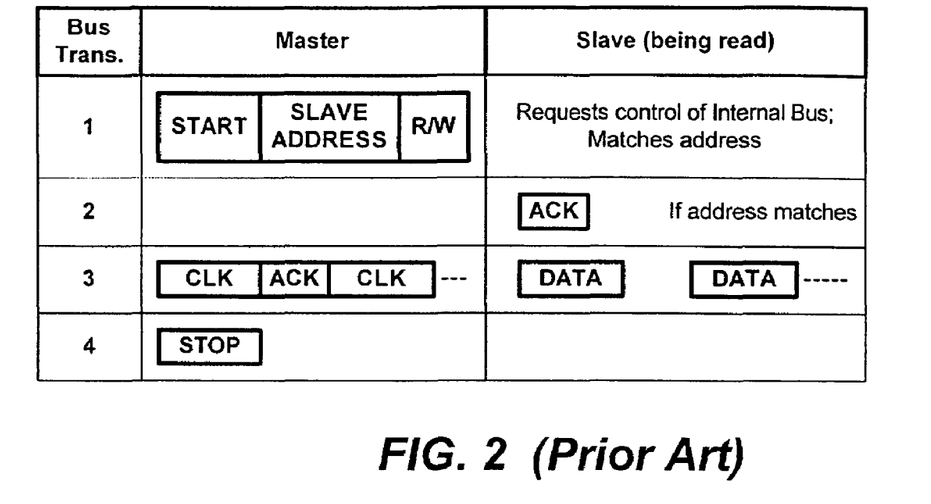
FIG. 2 illustrates an example bus protocol between a master device reading data from a slave device.

FIG. 2 illustrates an example bus protocol between a master device reading data from a slave device. The data in the slave device typically reside in a memory accessible via an internal bus of the slave device.

Each slave device on the bus is usually listening to any messages broadcast by a master device onto the serial bus 100. In bus transaction #1, the master device 20 attempts to communicate with a targeted slave device, such as 30-1, by putting out the targeted slave address onto the serial bus 100. It issues a message containing control signals and address, such as a START signal followed by a SLAVE ADDRESS word, followed by a read or write (R/W) control bit.

Each slave will be activated by a bus activity such as the arrival of the START signal from the master device. Upon activation each slave immediately sets out to perform two tasks. One is to start reserving its internal bus for possible memory access by the master device. The other task is to shift in the ADDRESS word and determine if it is the targeted slave device.

In bus transaction #2, each slave device will shift in the R/W control bit and the slave address. Only the targeted slave device (e.g., the slave device 30-1) with the matching address will reply and establish communication with the calling master device by returning an acknowledgement, ACK, signal. The other slave devices not matching the slave address do not respond.

In bus transaction #3, when the master device 20 is so acknowledged by the matching slave device, it transmits a train of clock signals to latch a block of data from the targeted slave device 30-1 through the bus 100. Upon successful completion of the transfer of one block of data, the master device issues an ACK signal followed by the next clock train to transfer the next block of data from the targeted slave device. In bus transaction #4, the data reading process continues until the master device signifies an end to the data transfer by issuing a STOP signal to the targeted slave device.

As mentioned earlier, each slave device needs to reserve its internal bus and memory resource as soon as a bus activity is detected (bus transaction #1.) This is necessary for each slave device while address identification is going on in order to allow sufficient time to get its memory ready for access in the short time leading to transaction #3, should the slave turn out to be the targeted one. In other words, owing to the timing requirement of the serial bus protocol, the serial bus access has a limited latency. When a master device is accessing the memory of a slave device via the serial bus, its access must be completed within the latency limit, otherwise serious error will occur. To support this, each slave device will typically begin to reserve memory resource ownership as soon as bus activity is detected.

Thus, until the address identification process is completed (end of bus transaction #2), all slave devices on the serial bus basically have their internal bus or memory resource reserved for external access to the exclusion of their internal agents. While this works fine when the bus access is destined for the memory resource, it may very well be that the access is intended for another slave device entirely, or for a separate function on the same device. This means all the non-targeted slave devices on the serial bus will have their internal bus or memory resource tied up for no purpose; and they will not find out until the slave address has been shifted in, compared and determined to be a mismatch. During that period, the memory resource of each slave device is unavailable to any of its internal agents.

SUMMARY OF INVENTION

Accordingly, it is a general purpose of the present invention to improve the performance of serial bus transactions.

It is also a purpose of the present invention to allow devices not addressed on a serial bus to be identified and freed up as soon as possible.

This and other purposes of the invention are accomplished, briefly, by implementing an incremental or bit by bit address decode scheme in order for each device on a serial bus to determine as soon as possible if it is the device being addressed by a master device. As each address bit is received serially into a device, it is immediately compared with a corresponding bit of the device's address. As soon as there is a bit not matching, the device in question is determined to not be the one addressed by the master device. It can then be disengaged from the communication process and free up as soon as possible its internal resource initially reserved for possible access by the master device.

The invention is advantageous over conventional systems in that the address sent by a master is decoded bit by bit rather than word by word. This is in contrast to conventional systems in which address matching can only take place after the whole word has been received.

Additional features and advantages of the present invention will be understood from the following description of its preferred embodiments, which description should be taken in conjunction with the accompanying drawings.

DETAILED DESCRIPTION OF THE PREFERRED EMBODIMENTS

Figure 3:
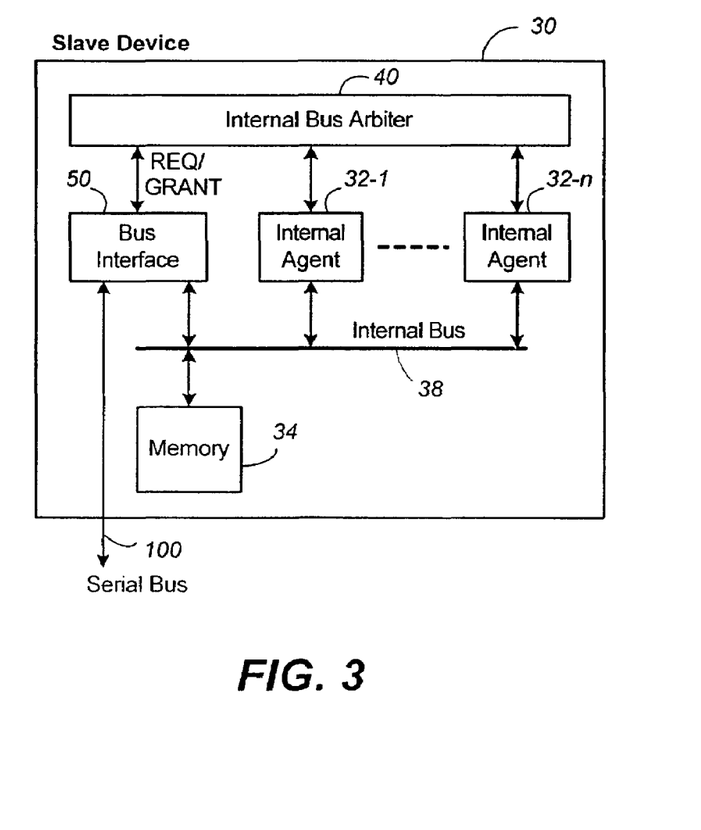
FIG. 3 is a schematic functional block diagram of a slave device.

FIG. 3 is a schematic functional block diagram of a slave device. The slave device 30 contains one or more internal agents 32-1, ..., 32-n sharing a memory 34 via an internal bus 38. The memory 34 can also be accessed external to the slave device via the serial bus 100. A bus interface 50 interfaces the serial bus 100 via the internal bus 38 to the memory 34. When an internal agent needs to control the internal bus 38 for bus transaction such as accessing the memory 34, it sends a request, REQ, to an internal bus arbiter 40. The internal bus arbiter decides among contending requests from other internal agents and/or the bus interface 50 to grant the requester the control of the internal bus 38. When a requester is given control of the internal bus 38, it receives a GRANT signal from the internal bus arbiter 40.

One example is for the master device 20 to access the memory 34 of a slave device such as that of device 30-1. The master device 20 attempts to initiate communication with the targeted slave device 30-1 by broadcasting the targeted slave address on the serial bus 100 (see FIG. 1 and FIG. 2, transaction #1.) The slave address for the slave device is preceded by a START signal, which activates the bus interface of each slave device on the serial bus 100 to get ready for address matching and for possible memory access. As soon as each bus interface 50 detects the START signal, it sends a REQ signal to its internal bus arbiter 40 to request control of its internal bus 38. This is usually configured as a top priority request and the internal bus arbiter 40 in each of the slave devices grants the request as soon as possible and reserves the internal bus and memory for external access to the exclusion of all other internal agents in each of the slave devices.

Figure 4:
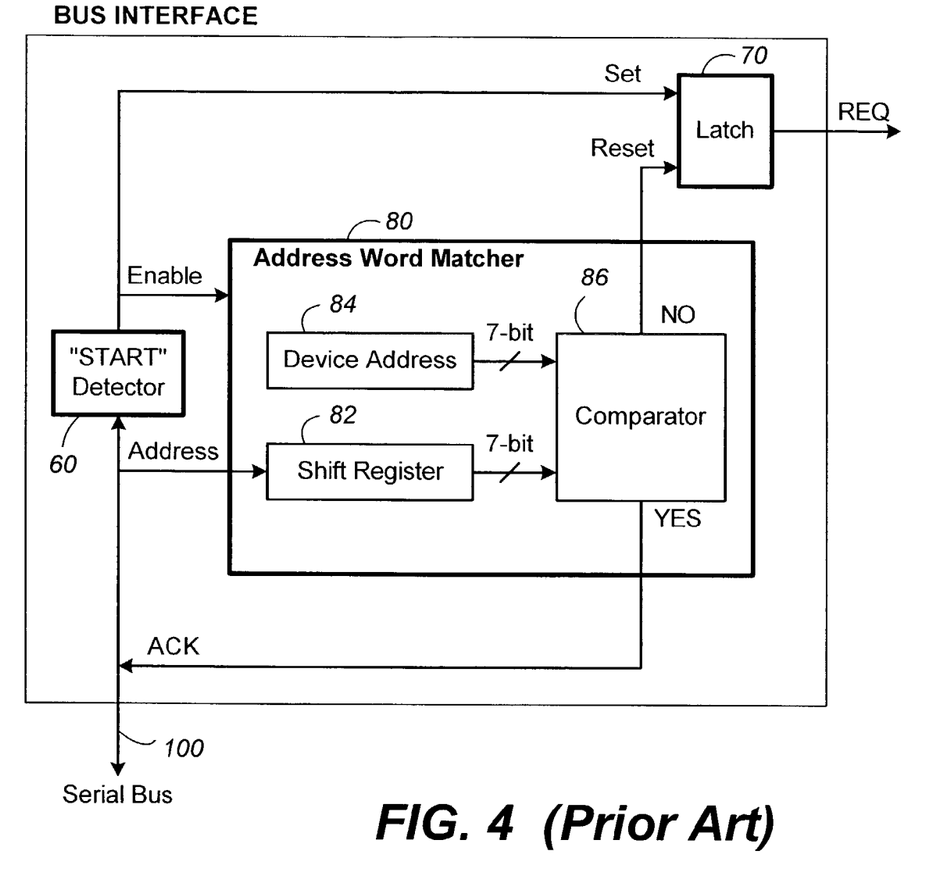
FIG. 4 is a schematic functional block diagram of a conventional implementation of the bus interface of FIG. 3.

FIG. 4 is a schematic functional block diagram of a conventional implementation of the bus interface of FIG. 3. The bus interface of a slave device typically has a START detector 60, a latch 70 and an address word matcher 80.

When the START detector 60 detects a START signal put out by a master device into the serial bus 100, it sets the latch 70 which in turn send a REQ signal to the internal bus arbiter 40 of the slave device to request control of the internal bus 38 (see FIG. 3.) At the same time, the START detector 60 enables the address word matcher 80.

The address word matcher 80 will typically shift the slave address into a shift register 82. After all address bits are shifted in, a comparator 86 matches the slave address word in the shift register 82 with the slave device's ID address word from a storage 84. FIG. 4 shows the each address word to be a 7-bit word as an example. If the two address words match, the comparator 86 returns an acknowledge ACK signal via the serial bus 100 to signal the master device to begin data transfer with the memory 34. If the two address words do not match, the comparator 86 resets the latch 70 which will de-assert the REQ signal. Thereafter, the internal bus arbiter 40 (see FIG. 3) will release the internal bus to service other requests.

Figure 5:
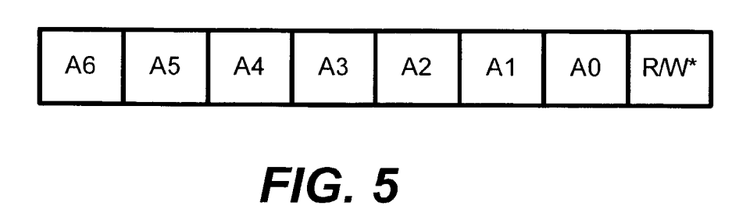
FIG. 5 illustrates an example slave address format put out by a master device.

FIG. 5 illustrates an example slave address format put out by a master device. It is a 7-bit address plus a following R/W bit indicating whether the transfer is a read or a write to the slave device. The slave address is put on the serial bus 100 by the master device 20 serially, starting with the most significant bit A6 and proceeding to end with the least significant bit A0. In general the device address is an N-bit address where N is a positive integer.

Figure 6:
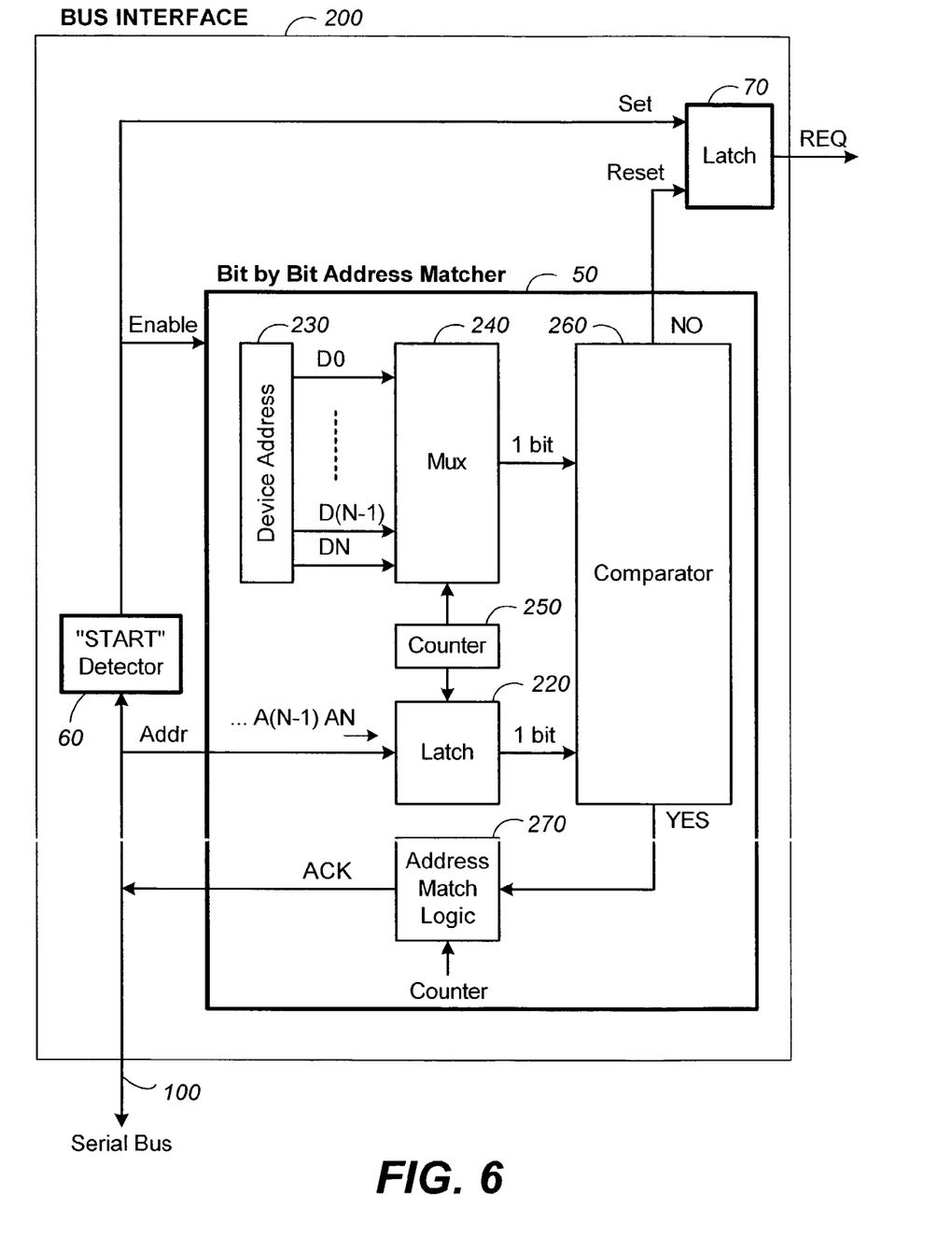
FIG. 6 is a bus interface having a bit by bit address matcher, according to a preferred embodiment of the present invention.

FIG. 6 is a bus interface having a bit by bit address matcher, according to a preferred embodiment of the present invention. Similar to the convention bus interface shown in FIG. 4, the present bus interface 50 is part of a slave device such as slave device 30-1 shown in FIG. 1. It provides an interface between the external serial bus 100 and the slave device's internal bus 38.

The bus interface 50 has a START detector 60, a latch 70 and a bit by bit address matcher 210. In operation, when the START detector 60 detects a START signal put out by a master device onto the serial bus 100, it sets the latch 70 to assert a REQ signal to the internal bus arbiter 40 to request control of the internal bus 38 (see FIG. 3.) At the same time, the START detector 60 enables the bit by bit address matcher 210.

The bit by bit address matcher 210 receives the slave address sent out by the master device from the serial bus 100. The slave address is received bit by bit into a latch 220 starting with the most significant bit AN followed by A(N-1), A(N-2), ..., A0. The latch 220 is controlled by a counter 250 such that with each count or clock cycle, it presents a next bit to a comparator 260.

The slave device stores an N-bit device address in a storage 230. Its individual bits, DN, D(N-1), D(N-2), ..., D0 are selectively sent bit by bit by a multiplexer 240 to the comparator 260. The multiplexer is controlled by the counter 250 such that with each count, it presents the next bit to the comparator 260. In this way, as each slave address bit is received, starting with the most significant one, it is being matched with a corresponding device address bit by the comparator 260.

After the comparator 260 of a slave device has matched all address bits, it signals an address match logic 270 to signal such an event to the master device. The address match logic is controlled by the counter 250. Essentially, after N counts and all N-bits are matched, the address match logic issues an ACK signal to the master device via the serial bus 100. This tells the master device that it is the targeted slave device and is ready to engage in data transfer.

For each of the other slave devices, during bit by bit matching, as soon as its comparator 260 finds a bit to be mismatched, it can then be determined that the device in question is not the targeted slave device. Its comparator 260 then resets the latch 70 to de-assert the REQ signal. Thereafter, its internal bus arbiter 40 (see FIG. 3) will cancel the reservation on its internal bus and memory and release them to service other requests.

This incremental address decode scheme is therefore different from the conventional method of receiving the complete word of the N-bit slave address before matching takes place. In the present incremental address decode scheme, the address appearing serially on the external bus is compared and checked with the device address bit by bit as soon as each bit is received. As soon as a mismatch is detected, the request to the arbiter is de-asserted and memory and internal bus ownership of the untargeted slave device is released. This allows minimal intrusion into internal device functions of the untargeted devices, since the memory is freed up as soon as possible. The device address may be such that its most significant bit is already different from that of the targeted slave address. Thus a mismatch may occur after the first address bit has been received, giving a one-clock address decode instead of an N-clock address decode. In this case, the arbiter may not even have had time to switch its grants; as a result, there will be zero impact on the operation of the internal functions of the untargeted slave device.

The total burden on the internal memory may be reduced by up to 87.5% compared with the conventional decoding scheme. This means the "down time" of the internal memory for the internal agents is cut by a factor of as much as eight.

In another embodiment, partial address having one or more bits are matched as soon as it is received. Advantage is gained as long as the matching is done without waiting for all bits of the address to be received before making a match.

Figure 7:
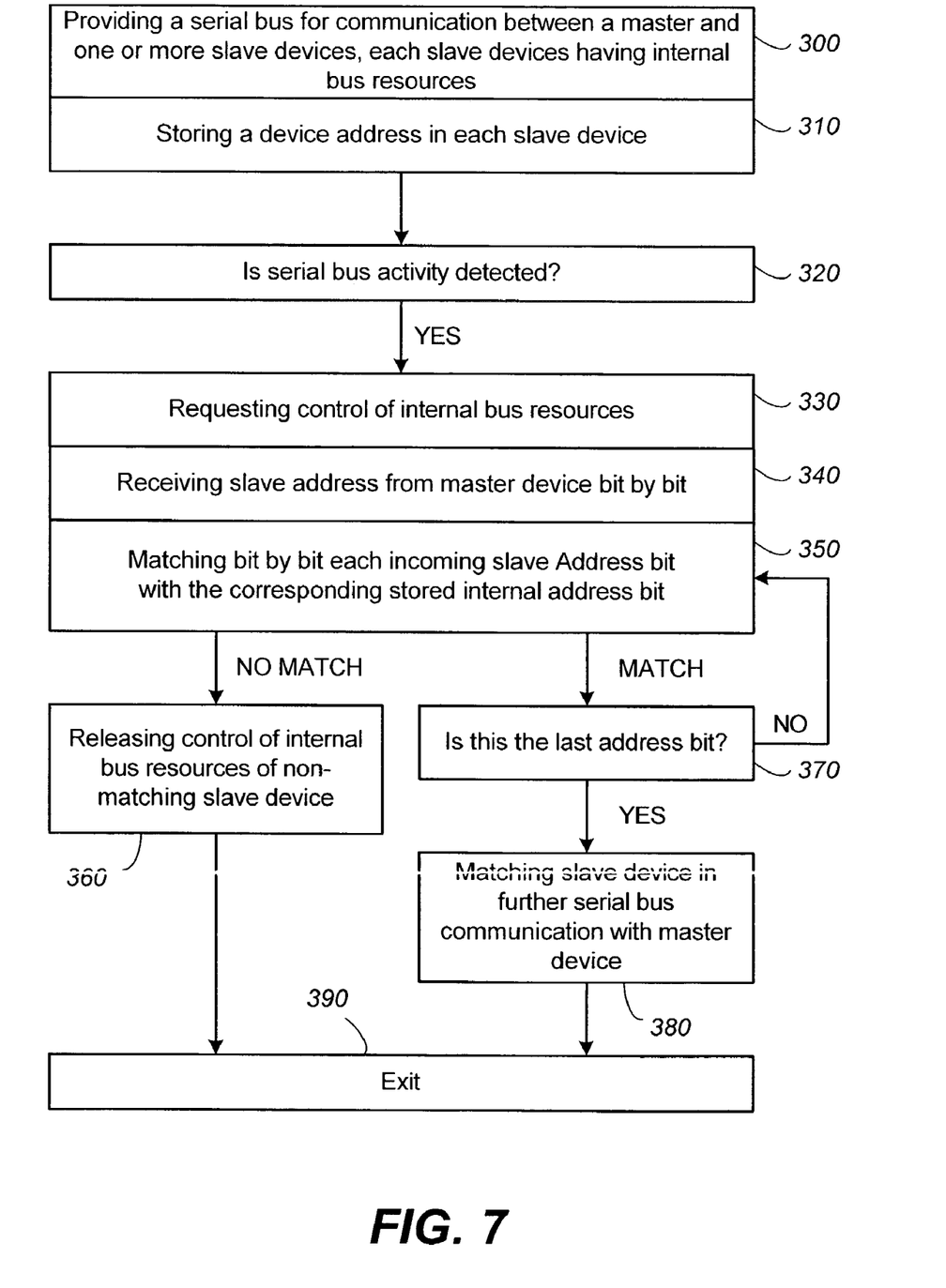
FIG. 7 is a flow chart illustrating a method of incremental address decode in a serial bus interface, according to a preferred embodiment of the invention.

FIG. 7 is a flow chart illustrating a method of incremental address decode in a serial bus interface, according to a preferred embodiment of the invention.

Step 300: Providing a serial bus for communication between a master and one or more slave devices, each slave device having an internal bus resource.

Step 310: Storing a device address in each slave device.

Step 320: Listening for serial bus activity. Proceeding to Step 330 only when a serial bus activity is detected.

Step 330: Requesting control of the internal bus resource.

Step 340: Receiving a slave address from the master device bit by bit

Step 350: Matching bit by bit each incoming slave address bit with the corresponding device address bit. If the bit mismatches, proceeding to Step 360. If the bit matches, proceeding to Step 370.

Step 360: In the case of a bit mismatch, the device is not the targeted device. Releasing control of internal bus resource of the non-targeted slave device. Proceeding to Step 390.

Step 370: In the case of a bit match, determining if it is the last address bit. If not, returning to Step 350. Otherwise proceeding to Step 380.

Step 380: Matching slave device in further serial bus communication with master device. Proceeding to Step 390.

Step 390: Exit

Although the various aspects of the present invention have been described with respect to certain embodiments, it is understood that the invention is entitled to protection within the full scope of the appended claims.

The invention claimed is:

1. A device communicating via a serial bus comprising:
an internal bus;
an internal bus arbiter for controlling said internal bus;
a stored device address for identifying said device;
a receiver coupled to said serial bus for receiving a predetermined first signal and an address bit by bit;
a detector responsive to detecting the predetermined first signal to activate said device for serial communication by causing the assertion of a request signal supplied to the internal bus arbiter;
a comparator coupled to match each bit of the received address as it is being received with a corresponding bit of said stored device address; and
an address match logic responsive to, either a mismatching of an address bit from said comparator to deactivate said device for serial communication by causing the de-assertion of the request signal supplied to the internal bus arbiter immediately upon detecting said mismatched bit, or a matching of all address bits to issue a predetermined second signal to said serial bus to acknowledge an address match.

2. A device as in claim 1, further comprising:
an internal resource accessible via said internal bus,
wherein the internal bus arbiter includes means responsive to the assertion of the supplied request signal for granting access to said internal resource by restricting access to the internal bus, and responsive to the de-assertion of the supplied request signal for withdrawing granting access to said internal resource by terminating the restricted access to the internal bus.

3. A device as in claim 2, wherein said device is one among a plurality of similar devices interlinked by said serial bus.

4. A device as in claim 2, wherein said device is one among a plurality of similar devices interlinked by said serial bus.

5. A device communicating via a serial bus comprising:
an internal bus;
an internal bus arbiter for controlling said internal bus;
a device address in a storage;
means for activating said device for serial bus communication by a predetermined first signal on said serial bus by causing the assertion of a request signal supplied to the internal bus arbiter in response to the predetermined first signal;
means for receiving an address bit by bit serially from said serial bus;
means for matching each bit as soon as it is received with a corresponding bit of the stored device address;
means for responding with a predetermined second signal on said serial bus after all address bits have been matched; and
means for deactivating said device for serial bus communication as soon as said means for matching detects a mismatch between one of said received addressed bits and its corresponding bit of the stored device address, said deactivating including de-asserting the request signal supplied to the internal bus arbiter.

6. A device as in claim 5, further comprising:
an internal resource accessible via said internal bus,
wherein the internal bus arbiter includes means responsive to the assertion of the supplied request signal for granting access to said internal resource by restricting access to the internal bus, and responsive to the de-assertion of the supplied request signal for withdrawing granting access to said internal resource by terminating the restricted access to the internal bus.

7. A device as in claim 6, wherein said device is one among a plurality of similar devices interlinked by said serial bus.

8. A device as in claim 5, wherein said device is one among a plurality of similar devices interlinked by said serial bus.

9. A method for a device to communicate on a serial bus, the device including an internal bus and a internal bus arbiter for controlling the internal bus, the method comprising:

storing a device address in said device;

activating said device for serial bus communication by a predetermined first signal on said serial bus by causing the assertion of a request signal supplied to the internal bus arbiter in response to the predetermined first signal;

receiving an address bit by bit serially from said serial bus;

matching each bit as soon as it is received with a corresponding bit of the stored device address;

responding with a predetermined second signal on said serial bus after all address bits have been matched; otherwise deactivating said device for serial bus communication as soon as said means for matching detects a mismatch between one of said received addressed bits and its corresponding bit of the stored device address, said deactivating including de-asserting the request signal supplied to the internal bus arbiter.

10. The method of claim 9, further comprising:

providing an internal resource of said device that is also accessible via said internal bus;

reserving access to the internal resource via said internal bus upon activation of said device; and canceling reservation to access the internal resource via said serial bus as soon as said mismatch occurs.

11. The method of claim 10, wherein said device is one among a plurality of similar devices interlinked by said serial bus.

12. The method of claim 9, wherein said device is one among a plurality of similar devices interlinked by said serial bus.

* * * * *

UNITED STATES PATENT AND TRADEMARK OFFICE
CERTIFICATE OF CORRECTION

PATENT NO.       : 7,013,355 B2                                    Page 1 of 1
APPLICATION NO.  : 10/340443
DATED            : March 14, 2006
INVENTOR(S)      : Peter Chambers It is certified that error appears in the above-identified patent and that said Letters Patent is hereby corrected as shown below:

Column 6,
Line 32, replace "claim 2" with -- claim 1 --.

Column 7,
Line 3, replace "claim 6" with -- claim 5 --.
Line 6, replace "claim 5" with -- claim 6 --.

Column 8,
Line 15, replace "claim 10" with -- claim 9 --.
Line 18, replace "claim 9" with -- claim 10 --.

Signed and Sealed this

Twenty-seventh Day of June, 2006

JON W. DUDAS
*Director of the United States Patent and Trademark Office*